(12) United States Patent
Vabnick et al.

(10) Patent No.: US 9,470,490 B2
(45) Date of Patent: Oct. 18, 2016

(54) PENALTY BOX

(71) Applicant: Federal Bureau of Investigation, Washington, DC (US)

(72) Inventors: Ian B. Vabnick, Fredericksburg, VA (US); Jeffrey T. Curtis, Unionville, VA (US)

(73) Assignee: United States of America as represented by the Federal Bureau of Investigation, Dept. of Justice, Washington, DC (US)

( * ) Notice: Subject to any disclaimer, the term of this patent is extended or adjusted under 35 U.S.C. 154(b) by 245 days.

(21) Appl. No.: 14/192,976

(22) Filed: Feb. 28, 2014

(65) Prior Publication Data

US 2016/0223304 A1 Aug. 4, 2016

Related U.S. Application Data

(60) Provisional application No. 61/770,399, filed on Feb. 28, 2013.

(51) Int. Cl.
*F42B 8/28* (2006.01)
*G09B 5/02* (2006.01)

(52) U.S. Cl.
CPC .. *F42B 8/28* (2013.01); *G09B 5/02* (2013.01)

(58) Field of Classification Search
CPC .............. F42B 4/18; F42B 8/00; F42B 8/02; F42B 8/12; F42B 8/28; G09B 5/02
See application file for complete search history.

(56) References Cited

U.S. PATENT DOCUMENTS

| 3,742,811 A | 7/1973 | Kablik et al. |
| 4,320,901 A * | 3/1982 | Morrison ................. A63F 9/24 273/153 R |
| 6,220,165 B1 | 4/2001 | Sullivan |
| 6,599,127 B1 | 7/2003 | Hopmeier et al. |
| 2008/0099692 A1 | 5/2008 | Poreira et al. |
| 2011/0053119 A1* | 3/2011 | Colon ...................... F41H 9/06 434/11 |

OTHER PUBLICATIONS

Shapnek, L.R., Technical Report—FY10 Technical Integration Project Initiator Simulator, Sep. 2010.
A-T Solutions, Inc., Electronics Detonation Simulator from EOD Tools in Products Catalog, https://catalog.a-tsolutions.com/ProductDetails.asp?ProductCode=ATS0504.

* cited by examiner

*Primary Examiner* — Timothy A Musselman
(74) *Attorney, Agent, or Firm* — Kristin K. Vidovich

(57) ABSTRACT

The present invention relates to a hot-wire detonator emulator that has the capability of monitoring switching in a simulated, mock, or inert improvised explosive device (IED) powered by direct current. One purpose of the inventive emulator is to function as an energetic witness substitute by replacing the detonator in an actual IED, thus enabling bomb technicians to conduct bench top and field analyses of IEDs, and to assess the effectiveness of render-safe procedures by, for example, illustrating how a detonator would react in a render-safe procedure.

18 Claims, 5 Drawing Sheets

PENALTY BOX

STATEMENT OF GOVERNMENT INTEREST

The invention described herein was co-invented by an employee of the United States Government and may be manufactured and used by or for the government for governmental purposes without payment of any royalties.

BACKGROUND

An improvised explosive device (IED) is a weapon that is fabricated or emplaced in an unconventional manner incorporating destructive, lethal, noxious, pyrotechnic, and/or incendiary chemicals or other materials designed to kill, destroy, incapacitate, harass, deny mobility, and/or distract. IEDs vary widely in shape, size, and form; however, they usually share three components: main charge, container, and initiator or initiating system, e.g., detonator. An IED may also contain one or more enhancements, which is a component deliberately added to an IED as a secondary hazard to modify or enhance the effect(s) or end result(s) of the IED. An enhanced effect can be, for example, additional physical destruction, fragmentation, or proliferation of dangerous substances, e.g., chemical, biological, radiological, or nuclear (CBRN) hazards. IEDs can be initiated at the IED or electronically in a wireless method by employing a transmitter and receiver, e.g., personal mobile radio, cell phone, cordless phone, or pager. If initiation occurs electronically in a wireless method, then the IED is known as a radio-controlled IED (RCIED).

The main charge is the explosive charge provided to accomplish the end result in, for example, munitions. Examples of end results include, but are not limited to, bursting a casing to provide blast and fragmentation, splitting a canister to dispense submunitions, and producing other deleterious effects. The main charge constitutes the bulk explosive component of an IED and can be configured for directional effects. Explosives fall into two categories: low and high yield. Low yield explosives are combustible materials that deflagrate, do not produce a shock wave, and must be confined to explode, e.g., black powder. High yield explosives are materials that detonate with a shockwave and do not require confinement, e.g., dynamite.

The second common IED component is the container, which is a vessel often used to conceal an IED or parts of an IED to prevent discovery of the IED by visual inspection. Alternatively, the container can be a confinement container, which is a vessel commonly used to hold the main charge together. Some examples of containers are carcasses, pipes, backpacks, jugs, tires, briefcases, vests, and vehicles.

The third common IED component is the initiator or initiating system (also known as an energetic witness). Any component used to start a detonation or deflagration can function as an initiator or initiating system, such as an electric match or a detonator. All initiators or initiating systems have time, power, and energy requirements and fall into two categories: non-electric and electric.

A non-electric initiator uses a stimulus, such as heat, shock, friction, or impact, to cause the explosive material to ignite or detonate. Non-electric initiators are activated by non-electrical means, e.g., the mechanical energy from a recoiled spring can actuate a non-electric initiator to subsequently detonate a main charge. Electric initiators are activated by an electrical impulse that creates heat or a spark. Examples of initiators include, but are not limited to: (1) blasting cap or plain detonator, which is an electric or non-electric device containing a sensitive explosive intended to produce a detonation wave upon activation; (2) exploding bridgewire (EBW), which is an initiator wherein a very high-energy electrical impulse is passed through a bridgewire, literally exploding the bridgewire and releasing thermal and shock energy capable of initiating a relatively insensitive explosive in contact with the bridgewire; (3) heat initiator, which is an initiator that serves as an igniting element through the application of heat, including direct heat, to a sensitive explosive; (4) light/flash bulb initiator, which is a device used as an electric initiator that incorporates a bulb to activate primary or low explosives; (5) percussion initiator, which is an initiator that serves as an igniting element when mechanically struck; (6) shock tube, which is, generally, a thin, plastic tube of extruded polymer with a layer of high explosive deposited on its interior surface that propagates a detonation wave to a blasting cap; (7) squib/igniter, which is any chemical, electrical, or mechanical device used to ignite a combustible material, e.g., initiate low or high explosives in a firing train; and (8) time fuse/safety fuse, which is a pyrotechnic contained in, generally, a flexible and weatherproof sheath that burns at a timed and constant rate and transmits a flame to a detonator or a low explosive charge with a pre-determined delay.

A common example of an electric initiator is a hot-wire detonator, which has at least three components: header, bridgewire, and ignition charge. The bridgewire can be wire, filament, or other form, and is generally comprised of a metal, such as gold, platinum, tungsten, or chromium; an alloy, such as nichrome, platinum/iridium, gold/iridium, gold/rhodium, or platinum/rhodium; or another conducting material, e.g., semiconductor. The most common bridgewire material is fine gauge nichrome wire. The bridgewire generally has lead wires for electrical inputs, but it can also be placed directly into an electric connector.

The bridgewire produces heat when current is applied, which causes the explosive material to ignite or detonate. The base energetic material for many hot-wire detonators is a pyrotechnic mixture known as a pyrogen that requires heating to a particular minimum temperature to start a reaction. The heat generated by the bridgewire initiates detonation, because, when electric power is applied, heat is imparted to the pyrogenic mixture causing it to ignite and/or causing a small explosive charge to detonate. Alternatively, a detonator may contain a bridgewire that explosively vaporizes after application of a sudden surge of power. In many detonators, the energies required to bring a thermal bridgewire up to a sufficient initiation temperature (about 350° C.) is less than about 15 mJ with reliable firing when the power is greater than about 40 milliwatts.

In addition to the main charge, initiator or initiating system, and container, IEDs contain a power source, which stores or releases electrical or mechanical energy to initiate the IED's main charge. The most common power source found in an IED is a battery or batteries. Alternating current may also be used as the power source. The key elements of a power source are: type/source; number of components, e.g., batteries, and their configuration (series or parallel); voltage (if applicable); and how it is connected to close an IED switch, which is another component of an IED.

The switch is a device for making, breaking, or changing an electrical or non-electrical connection. Insurgents and terrorists often employ switches to arm or fire an IED. A single switch can have multiple functions, e.g., safe-to-arm and fire. Some bomb makers use safe-to-arm switches to reduce the risk of accidental detonation during IED emplacement. Electric IEDs are classified by their firing switches into three main categories: command switches, time switches, and victim-operated switches.

Currently, training aids used at training facilities for bomb technicians, such as the Hazardous Devices School in Alabama, do not use energetic witnesses and there is no effective substitute for an energetic witness. One reason for needing an effective energetic witness substitute is because it can function as an audible or visual witness in a training aid, thus avoiding the use of an actual energetic witness, which can be hazardous due to the potential for fire and bodily injury. In addition, in view of the potential hazards, the use of actual energetic witnesses limits venues available for training and testing. Another reason for the need for energetic witness substitutes is the fact that detonators and electric matches, for example, which are used in real IEDs, are fast responding devices, which is a consideration in render-safe procedures (RSP) used to disable or reduce the functionality of IEDs.

Energetic witness substitutes currently in use, e.g., buzzers, vibrators, indicator lights, and beepers, may indicate a switch was thrown in a training IED or other target device being tested, but they do not take into account the power and energy requirements or the time-to-function of a real IED, and thus cannot indicate whether the power, energy, and time thresholds needed for the IED to function have been reached. For example, a switch may be transiently triggered so that the slow response of indicator lights, beepers, or other responses go undetected. If a switch closes and then opens and the indicator (light or beeper, for example) is on for a very brief period of time, there may be no detectable response to the observer. If the indicator has a slow response time, it may never turn on due to a fast transient stimulus. In other cases, a light or beeper, for example, may have nominal power requirements to produce visible light or sound, respectively. If the IED output does not provide enough current to produce visible light or audible sound, respectively, it may appear as if nothing happened. It is possible to have continuous current or a current pulse flowing through an incandescent bulb, for example, yet no light is detected. However, an actual IED will consistently function after receiving the same stimulus. Moreover, certain lights and beepers designed for low power devices, such as light emitting diodes (LEDs), piezo beepers, and buzzers, may activate, despite the detonator power and energy thresholds not having been met.

In addition to buzzers, beepers, vibrators, and indicator lights being poor indicators of IED switching and functionality, they are also inadequate for determining whether an IED would function during an RSP. A completely rendered safe device has all its functional components separated and placed in an environment that minimizes any hazard they present. Currently, no method exists that employs a non-explosive component to effectively duplicate the performance of a detonator in a mock IED or in the firing circuit of a recovered, but inert or rendered safe, IED for the purpose of demonstrating its viability as a functional device. A mock IED is an IED manufactured based on a circuit diagram or a surrogate copied from an IED recovered in situ, but without an initiator or explosives. In comparison, an inert IED is an IED recovered in situ, e.g., from the field, wherein the explosive components have been removed, but the fusing and firing system is intact and functional, less the initiator.

In addition to the need for safe energetic witness substitutes by the bomb technician community, the intelligence community, which is often challenged with analyzing IED schematic diagrams and IEDs recovered overseas, has a need for such safe alternatives. There is a constant flow of new IEDs and the U.S. Government needs to know if these devices will function as designed and thus, whether they are potential threats to national security. Bench-top and field testing of recovered IEDs is vital to address needs of the intelligence community.

The goal when defeating an IED is to prevent or mitigate its physical or chemical effect(s) while neutralizing the adversary's ability to exploit the value of the effect(s) in terms of building a platform to generate fear, terror, or propaganda. Countering an IED using defeat actions begins once the device has been emplaced and includes rendering it safe and conducting a thorough forensics analysis. Information derived from the physical exploitation of an IED and the analysis of how it was employed can be used as a basis for a variety of initiatives, including the development of technologies to detect and/or neutralize such devices and, ultimately, protect individuals.

BRIEF SUMMARY

The present invention relates to a device that emulates an initiator or initiating system and that has the capability of monitoring switching in a simulated, mock, or inert improvised explosive device (IED) powered by direct current. One purpose of the inventive emulator is to function as an energetic witness substitute by replacing the detonator or other initiator or initiating system in an IED, thus enabling bomb technicians and engineers, for example, to conduct bench-top and field analyses of IEDs and to assess the effectiveness of render-safe procedures (RSP). The present invention further relates to a training device that functions as a switch detector to assist with bomb technician training This training device is a means to generate real world training scenarios quickly and economically for bomb technicians and others involved in countering threats from explosive devices.

The inventive detonator emulator, coined the "Penalty Box" ("PB"), which, preferably, emulates an electric initiator, and, more preferably, emulates a hot-wire detonator, provides bomb technicians, trainees, engineers, and members of the intelligence community with a tool to answer critical questions regarding IEDs in a safe manner. For example, bomb technicians can use the PB in manual entry and in energetic RSPs (whereby explosives are used as a component to disable or disrupt an IED), to develop new RSP methods, including attempting to beat the functioning time of an IED, and to validate tactics, techniques, and procedures for existing RSPs. Moreover, the PB can be used to rapidly and safely assess whether a particular IED design will function as intended.

The PB can be used to develop RSPs that effectively disarm or disrupt an IED by determining the slowest round that will disarm or disable the IED power source, e.g., battery, and thus the power circuit. If a detonator emulator only has switch detection and the switch is triggered, then the training device will indicate failure, i.e., that the IED would have detonated prior to disarmament or disablement. However, due to the IED power and energy requirements and time threshold, described above, there may have been time to disarm or disable the IED between switch activation and detonation. The PB makes this distinction.

The PB, a preferably portable and lightweight device, accurately emulates a hot-wire detonator, because it is generally configured to have the same load characteristics and response characteristics as a typical detonator. Thus, in some embodiments, the PB has the characteristics of the average commercial hot-wire detonator, such that a simulated bridgewire is selected to have a one ohm load; the no-fire current level is set to 200 mA; and the timing circuit is calibrated to emulate a five mJ/ohm firing impulse. The PB timing circuit follows the theoretically predicted behavior of a typical detonator when current flowing through the simulated bridgewire is above one ampere (typical all-fire value). However, the PB has the flexibility to adjust load characteristics and response characteristics to match a wide variety of detonators.

In other embodiments, the PB can be used to monitor switching in a mock or inert IED powered by direct current, including during an energetic disruption of the IED. The switch monitoring circuit of the PB can detect a small, e.g., less than about 10 mV, voltage transient across a simulated bridgewire, with a fast response time of less than approximately 10 microseconds.

In other embodiments, the PB is polarity insensitive, i.e., the direction that the current flows through a simulated bridgewire does not matter.

In other embodiments, the invention relates to a system for simulated explosives training, comprising: a simulated, mock, or inert explosive device without an initiator; at least one sensor connected to said simulated, mock, or inert explosive device; the sensor outputting a signal corresponding to a measurable parameter sensed by the sensor and comprising a simulated initiator; a controller interfacing with said sensor; a feedback device interfacing with said controller, wherein the feedback device is actuated in response to the signal achieving a pre-determined threshold; and a display for displaying a representation of said signal, wherein the representation of said signal is displayed in real time.

In other embodiments, the invention relates to a method for simulated device training or testing, comprising: providing a simulated explosive device without an initiator connected to at least one sensor, the sensor having a simulated initiator and able to produce a signal corresponding to a measurable parameter sensed by the sensor; firing a projectile into the simulated explosive device; receiving a signal from the at least one sensor; providing feedback on the simulated explosive device in response to the signal reaching a pre-determined level; and displaying a representation of said signal, wherein the representation of said signal is displayed in real time.

In other embodiments, the invention relates to a method for training a bomb technician or trainee, comprising: providing a simulated bomb without an active initiator connected to at least one sensor in a device having a simulated initiator; disrupting or disarming the bomb causing the device to receive a signal corresponding to a measurable parameter sensed by the sensor; analyzing the sensor data received by the device from the at least one signal; and providing feedback in response to the sensor data to the bomb technician or trainee. The feedback optionally involves playing a captured video representation of the bomb technician or trainee and assessing the video representation. The video representation, obtained using, for example, a camera, can then be used in further testing or training In some embodiments, the sensor data from the at least one signal is received in real time.

In some embodiments, the threshold of the at least one sensor is adjusted.

In some embodiments, the invention relates to a simulated detonation device comprising: at least one bridge emulator, at least one amplifier or difference follower circuit, at least one electrical isolation circuit, at least one switch detection circuit, at least one no-fire comparator circuit, at least one voltage threshold delay timer selector circuit, at least one voltage dependent delay timer circuit, at least two latching output switches, at least one circuit breaker, at least two attachment points attached to the outside of the device, and at least two indicators.

In some embodiments of the simulated detonation device, there are at least two voltage dependent delay timer circuits.

In some embodiments of the simulated detonation device, there are three indicators.

In some embodiments of the simulated detonation device, the indicators represent the existence of power to the device, device or switch activation, and detonation or firing. In certain embodiments, the indicators are light emitting diodes (LED) and are green, yellow, and red, respectively.

In some embodiments of the simulated detonation device, at least two leads of a mock or inert IED are attached to the at least two attachment points attached to the outside of the device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

In FIG. 3, the PB circuitry is housed in a small, project box-like structure (2). The housing (2) can be cast aluminum, plastic, such as ABS material, or other appropriate material. Moreover, the PB can be made water resistant by selecting a project box or other housing (2) that contains a gasket seal and water-proof switches. The connectors (1) in the figure are terminal blocks, however any type of connector can be used, such as binding posts or spring loaded quick connects. Leads (not shown) attached to the PB connectors (1) emanate from a training aid or IED being tested (not shown).

Figure 1:
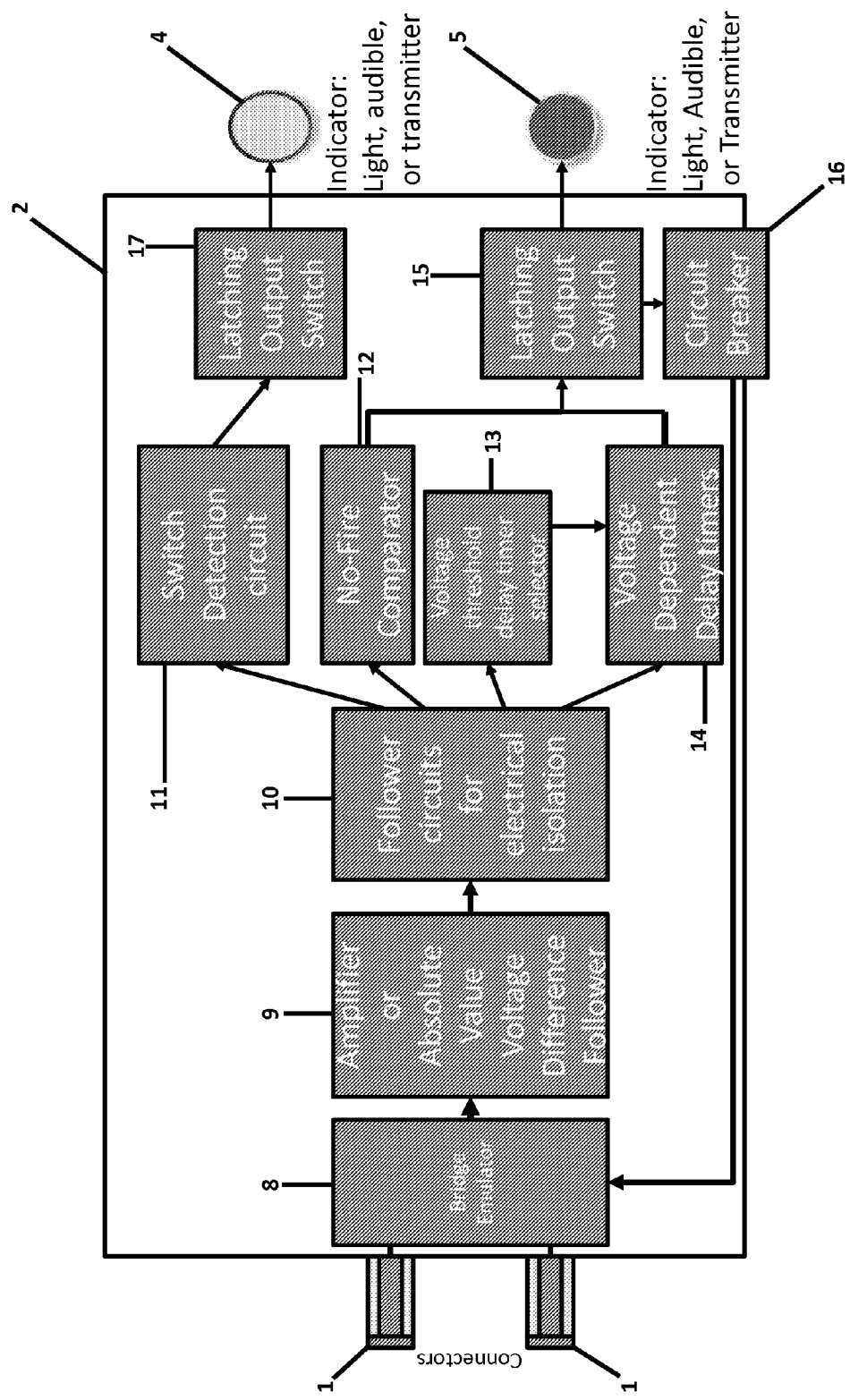
FIG. 1 is a block diagram of one embodiment of the PB. An IED (not shown) is attached to the PB at the connectors (1), which are attached to the PB housing (2). Polarity insensitivity is created through the voltage amplifier or absolute value voltage difference follower (9) when current flows through the bridge emulator (also referred to as a "bridgewire emulator") (8). The voltage output of the voltage amplifier or absolute value voltage difference follower (9) ultimately selects the voltage dependent delay timer (14) and sets the delay. If the current through the bridge emulator (8) exceeds the no-fire threshold and current remains past the delay time, then the latching output switch (15) is triggered. The circuit breaker (16) activates following latching output switch (15) triggering and causes an indication of detonator firing (5). Any presence of voltage across the bridge emulator (8) triggers the switch detection circuit (11) and activates the latching output switch (17), which causes an indication of switch detection (4).

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The specification discloses embodiments that incorporate features of the invention. The disclosed embodiments merely exemplify the invention and the scope of the invention is not limited to the disclosed embodiments. The invention is defined by the claims appended hereto.

The description of the embodiments of the invention, and references in the specification to "one embodiment," "an embodiment," "an example embodiment," "some embodiments," "example," etc., indicate that the embodiments may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art(s) to link such feature, structure, or characteristic in connection with other embodiments whether or not explicitly described.

Penalty Box Design and Operation

The Penalty Box ("PB") emulates an initiator or initiating system. In preferred embodiments, the PB functions as an electric initiator, specifically, a detonator, and, as stated above, all initiators and initiating systems have time, power, and energy requirements.

One way to describe the relationship between power and firing impulse (energy per ohm) is to consider the heat energy produced when current flows through an initiator, such as a detonator, specifically, the bridgewire in a detonator. When power, e.g., electric power, is applied to a bridgewire, the bridgewire heats up until the first fire explosive material in the pyrotechnic mixture surrounding the bridgewire reaches ignition or decomposition temperature. The PB uses an approximation for power values above the all-fire condition, which is the power threshold when all the energy goes into the first fire explosive material and no energy is lost to the surroundings. Under these conditions, the energy becomes approximately constant for all power values above the all-fire power value. The energy per ohm is known as the firing impulse and is empirically determined. Knowing the value of the power applied, the firing impulse (energy per ohm), and the bridgewire resistance allows one to calculate the time it would take to reach the ignition or decomposition temperature of the first fire explosive material.

For safety reasons, a no-fire condition is built into initiators. Sustained power applied below the no-fire condition will not fire a detonator with 99% confidence. A common value for the no-fire condition is 40 milliwatts, which, for a one ohm bridgewire, is equivalent to a constant current of 200 mA. Using Ohm's Law, the 200 mA is equivalent to a 200 mV drop across the bridgewire. In the PB, a circuit element, the no-fire comparator (12) compares the voltage output from the absolute value voltage difference follower or amplifier (9) to the no-fire threshold, which, in this case, is 200 mV. If the voltage is below 200 mV, the no-fire comparator (12) prevents the PB output from being triggered no matter how long the voltage is applied to the bridge emulator (8).

The PB response characteristics are based on two parameters: the time that power is applied across the simulated bridgewire, and the no-fire condition. The PB approximates the time requirements of a hot-wire detonator by measuring the voltage drop across the bridgewire emulator and then converting the voltage to an absolute value, which makes the PB polarity insensitive. This conversion is accomplished by an absolute value voltage difference follower circuit or differential amplifier circuit (9). The absolute value voltage difference follower or differential amplifier circuit (9) communicates the voltage value to different circuit elements, preferably, four circuit elements, as illustrated in FIG. 1 ((11), (12), (13), (14)). Communication occurs through at least one follower circuit (10), which is a circuit element used to improve the circuit design and increase accuracy. It is a "pass through" element that prevents the individual functional circuit blocks from influencing each other.

One of the preferably four different circuit elements that ultimately receive the voltage value is a delay-to-trigger circuit (also referred to as a "voltage dependent delay timer" (14)) and is set for the PB output based on the relationship between power and the firing impulse of common bridgewires. If power is not applied for enough time to meet the firing impulse requirement, i.e., the power is applied less than the electronic delay, then the output, e.g., indicator light (5), of the PB does not activate. Thus, the PB does not just indicate firing, it provides information to the bomb technician, trainee, or engineer as to why firing occurred or did not occur.

Figure 4:
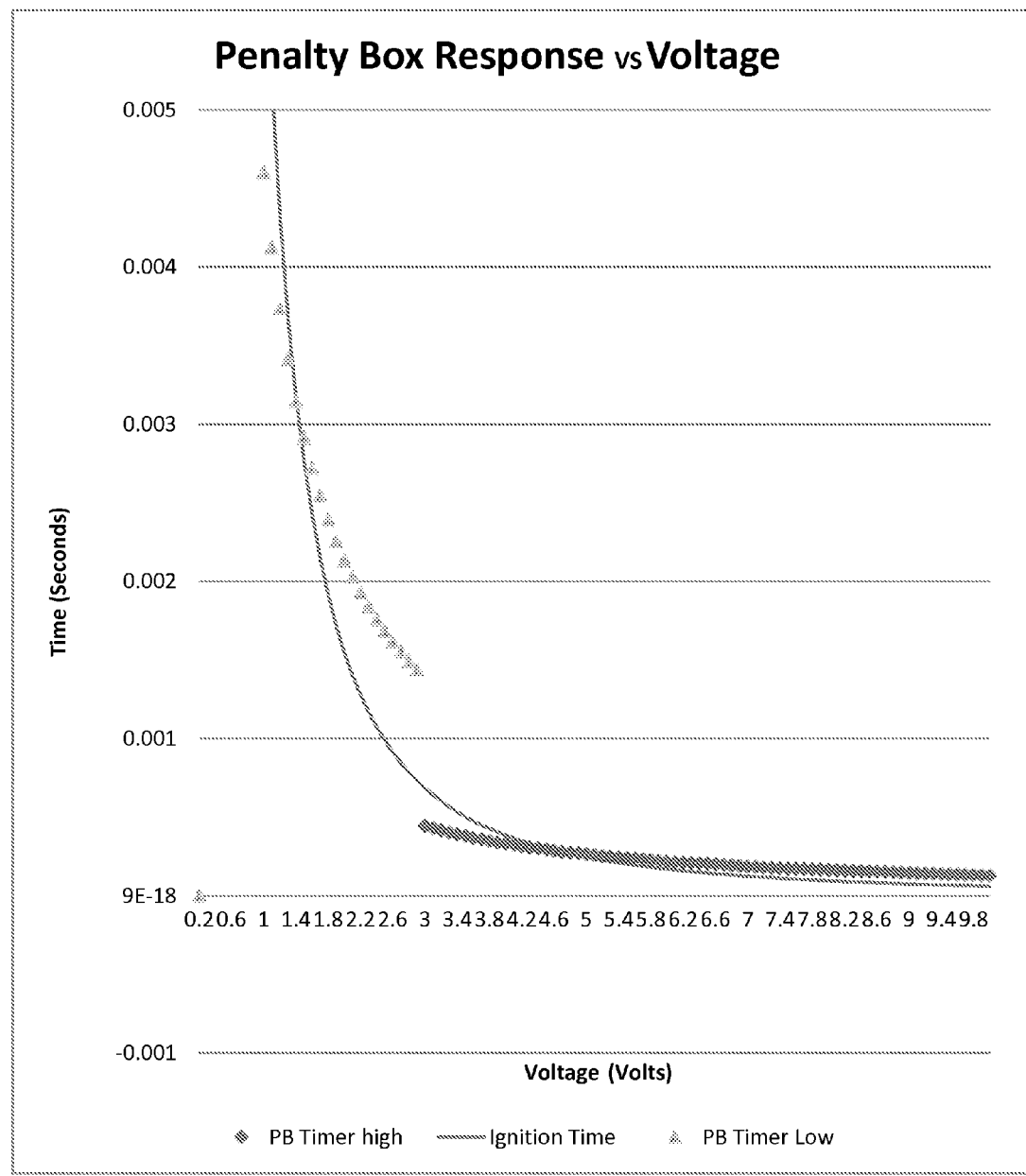
FIG. 4 is a plot of a PB response (measured by trigger time) versus voltage drop across a simulated bridgewire. This plot is based on computational models of the PB voltage-dependent timer circuits. As shown in the figure, there is a small voltage range, approximately 2-3 volts, where the PB is less accurate, but accuracy improves below this voltage range. Improved accuracy can be accomplished by using additional timer circuits that approximate the ignition time over shorter voltage ranges as described in greater detail below. Plotting the PB trigger time with respect to the voltage drop across the simulated bridgewire and comparing this time to the ignition time predicted for a detonator experiencing the same voltage drop, results in closely correlated plots. The times were calculated for power supplied by a single-celled alkaline battery and by multi-celled alkaline battery systems. The modeling predicted the behavior of the timer circuit and closely followed a detonator response either above or below 3 volts.
Figure 5:
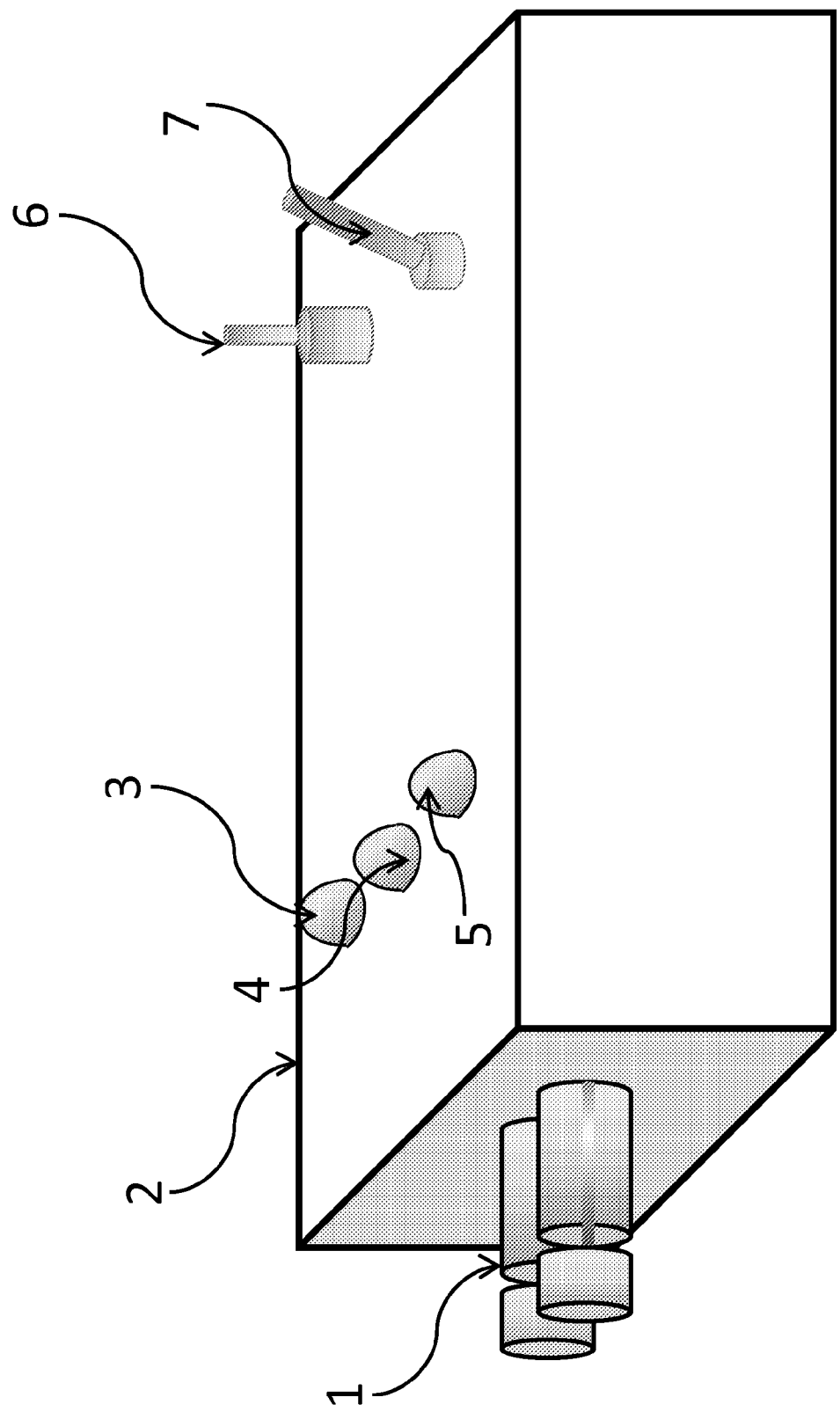
FIG. 5 is a drawing of another embodiment of the PB, wherein the PB comprises: IED connectors, such as dual binding posts (1); three LEDs: one LED indicates power (3), one LED indicates detonator firing (5), and one LED indicates switch detection (4); on/off toggle switch (7); and a push button reset switch (6); and is housed in a box-like structure (2).

Because the method the PB uses to set the delay only approximates ignition time, and because the delay timers are only accurate for a limited voltage range, it is preferred to use multiple delay timers to cover the complete range of possible voltage drops across the bridgewire emulator. As seen in FIGS. 1 and 4, when two voltage dependent delay timers are used, the voltage threshold delay timer selector (13) disables the high voltage delay timer when the voltage drops below 3 volts (in the FIG. 4 example), thus allowing the lower voltage delay timer to drive the PB output. Although for most devices, a single timer circuit will suffice, particularly for devices that can output 3 volts or higher, for improved accuracy at least two voltage dependent delay timer circuits (14) are recommended. This recommendation applies to devices powered by a low voltage, single-celled power source, e.g., 1.5V battery, to devices powered by a higher voltage, multi-celled power source, e.g., 9V battery or battery networks with voltages up to and including 27V. If even higher accuracy is desired, three or more voltage dependent timer circuits can be used, whereby each timer covers a small segment of the voltage scale.

The PB's voltage-dependent delay timers emulate the ignition time characteristics of a hot-wire detonator. Detonators need to experience an electric power for a specific period of time before they are committed to fire. If the power or current is too low or is applied for too short a time, the detonator will not fire. These firing conditions can be modeled electronically. Because the voltage difference across the bridgewire emulator (8) is needed to determine the power and/or current, an absolute value voltage difference follower or differential amplifier (9) monitors the voltage across the bridgewire emulator (8) and electrically isolates the bridgewire emulator (8) from the timing circuit. This electrical isolation is essential to restrict the only draw on the IED's power through the bridgewire emulator (8) and not the other elements of the PB circuitry. The timer circuit reads the output voltage of the absolute value voltage difference follower or differential amplifier (9) and sets a trigger time.

As stated above, to improve response behavior over the complete range of voltages, two voltage-dependent delay timer circuits (14) can be used: one timer sets the trigger time below a chosen threshold voltage, such as below 3V, and one sets the trigger time for the threshold voltage and above, such as 3V and above. The voltage threshold timer selector circuit (13) determines which timer is active. The timer circuits set the delay for the no-fire comparator (12) to trigger a silicon controlled rectifier (SCR). The SCR is the latching switch that drives the magnetic relay and the indicator light. This occurs when the no-fire comparator (12) compares the reference voltage to a rising voltage at the timer circuit output. The no-fire comparator (12) will not output a signal to trigger the SCR until the output voltage of the timer circuit exceeds the reference voltage. The timer circuit initially outputs zero volts and the voltage grows while power is applied to the bridgewire emulator (8). The SCR latches the output in an "on" state, e.g., indicator light. The SCR drives the magnetic relay switch, which is part of the latching output switch circuit, and it remains energized. When the PB experiences a voltage below the threshold, e.g., 3V, the circuit calibrated for 3V and above is disabled by the voltage threshold timer selector circuit (13) and cannot trigger the output. Thus, if power is applied for less than the trigger time, the PB does not indicate firing.

In order to have polarity insensitivity, which is a preferred feature of the PB, two differential amplifier (alternatively, absolute value voltage difference follower) circuits can be used to read the voltage across the bridge emulator. The no-fire condition is set by a voltage comparator, such that when the emulator bridge experiences 200 mA or above, for example, the PB indicates firing. Below 200 mA, for example, the PB output is disabled and will not indicate firing no matter how long the power is applied to the emulator bridge.

A switch detection circuit (11) monitors the amplifier circuit's (9) voltage. It does so by monitoring the voltage drop across the emulator bridge via the amplifier circuit (9). The switch detection circuit (11) preferably comprises an operational amplifier configured to trigger at one mV or above. The response time of operational amplifiers can be in nanoseconds, which makes them ideal to detect switching, even if a switch momentarily bounces or activates. In some embodiments, absolute value voltage difference follower circuits are used instead of amplifier circuits.

The PB output activates in approximately the same time as it would take a detonator to reach the ignition temperature of the first fire explosive if it experienced the same amount of current. After the time to ignition is reached, a detonator is committed to explode even if the current is removed. Thus, if current is applied for less than the predicted ignition time of a detonator, the PB output does not activate and latch on. The output of the PB can be, for example, a radio signal, a visible light indicator, such as an LED, or an audible alarm, such as a buzzer or beeper. In preferred embodiments, the output is at least one visible light indicator. To indicate detonation or firing, the visible light indicator is preferably red. To indicate switch activation, the visible light indicator is preferably yellow. In more preferred embodiments, a green visible light indicator is also used, to indicate that the PB is powered on.

In one embodiment, the bridge emulator in the PB comprises a front end one ohm precision equivalent resistor constructed of a resistor network comprising, for example, four resistors. The ends, preferably, there are two ends, of the front end resistor network are the connection points for an external mock or inert IED. More specifically, the PB can be attached by attachment points to leads that attach to an inert or mock IED. Connectors on the outside of the PB are the attachment points. They can be quick connects or thread down positive locking mechanisms, such as terminal blocks or binding posts. A one ohm resistance is preferred, because one ohm is a common bridgewire resistance for fast responding commercial detonators. However, the load value of the front end resistor network can be adjusted to match any bridgewire resistance.

In another embodiment, the PB's load property is generated using a resistor network constructed of precision 1.5 ohm and 0.5 ohm resistors to emulate the resistance of a one ohm bridgewire. However, two 2.0 ohm precision resistors wired in parallel would provide the equivalent load. In an IED, a typical detonator experiences between one to ten amperes of current, and thus 100 watt rated precision resistors can be used to prevent overheating and allow repeated usage. The configuration of the resistor network increases the overall wattage rating of the circuit and provides noise reduction. A temperature independent constant load is often used because a nichrome bridgewire resistance only changes by approximately 3% during the time that the bridgewire heats to ignite the pyrogen or primary explosive inside the detonator.

In some embodiments, the PB uses a magnetic relay switch to emulate the bridgewire breaking, e.g., fusion and/or melting, which disconnects the artificial bridgewire (also referred to as the bridge emulator) from the IED or other target device being tested after the PB output has been activated. The magnetic relay switch is analogous to a household circuit breaker. The magnetic relay switch's normally closed and common contacts are, preferably, wired in series with the external PB connectors and when the relay switch is activated, the circuit between the target device and the artificial bridgewire is broken.

The PB has the ability to latch after triggering. This provides the bomb technician or other operator with a visual or audible indication of switching and/or firing without having to witness the event at the time of occurrence. Alternatively, it is possible to add circuitry to have the PB transmit a radio frequency signal when it has alarmed, thus providing instantaneous feedback to the operator. These indicators enable the operator to be away from the target device being tested, thus enhancing the safety factor when using energetic or explosively driven tools, such as disarmers and disrupters.

The PB uses completely discrete electronic components and integrated circuit chips and does not use digital processing. The PB timing circuit is an analog solution to setting the response characteristics of the PB. By using analog circuitry, the PB can be mass produced using components, such as those in FIG. 2. Components include, but are not limited to, one or more: voltage regulators, battery clips, binding posts or terminal blocks, LEDs or other indicators, standard diodes, operational amplifiers ("Op Amp"), carbon film resistors, variable resistors, capacitors, high wattage precision resistors, silicon controlled rectifiers, magnetic relay, toggle, and/or push button switches, bipolar junction transistors and field effect transistors, jumper wires, stranded lead wires, printed circuit boards, and project boxes. These components are readily available and the total fabrication cost is minimal.

Figure 2:
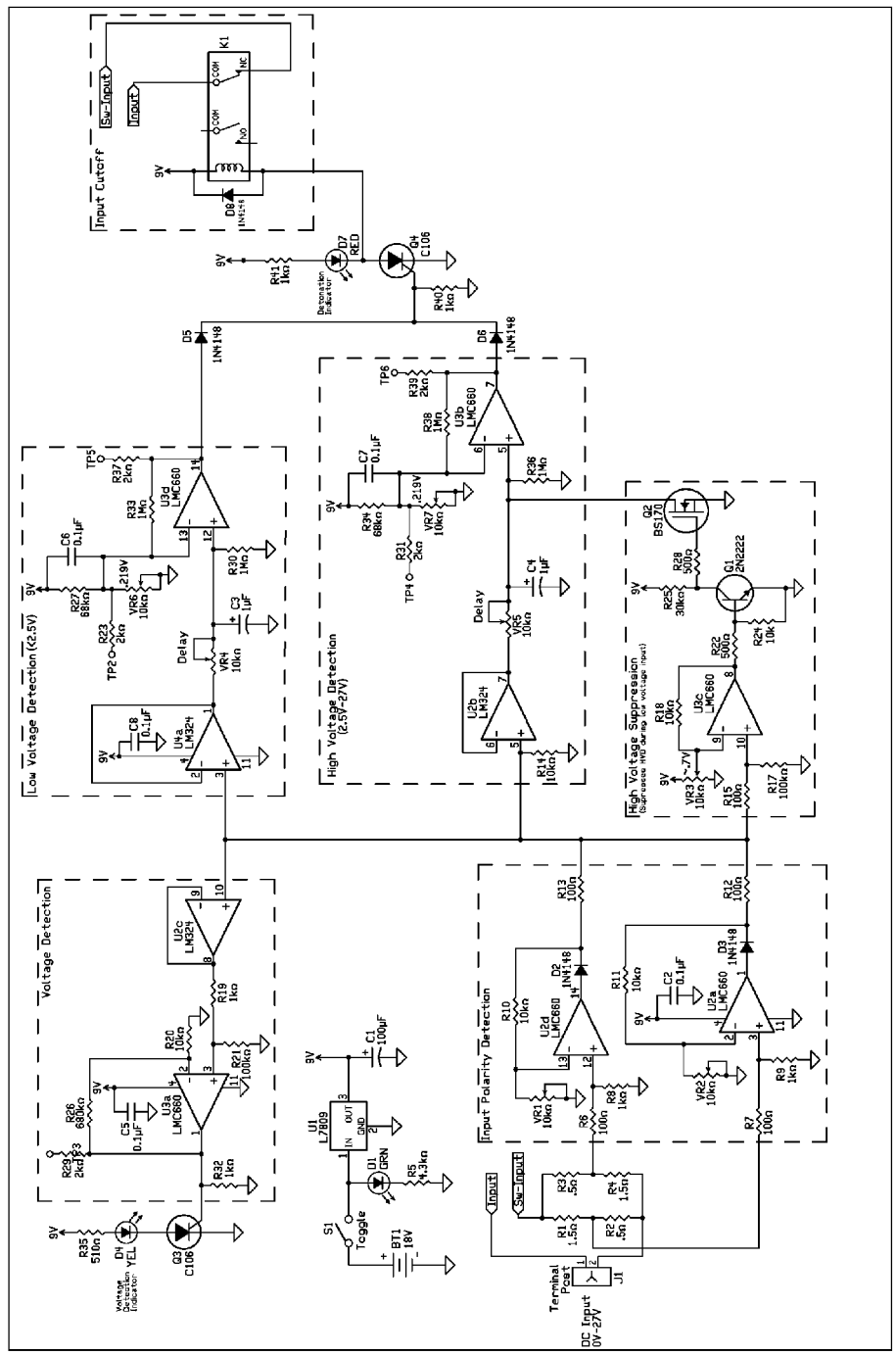
FIG. 2 is a schematic circuit diagram of one embodiment of the PB circuitry, wherein the voltage threshold is 2.5V.
Figure 3:
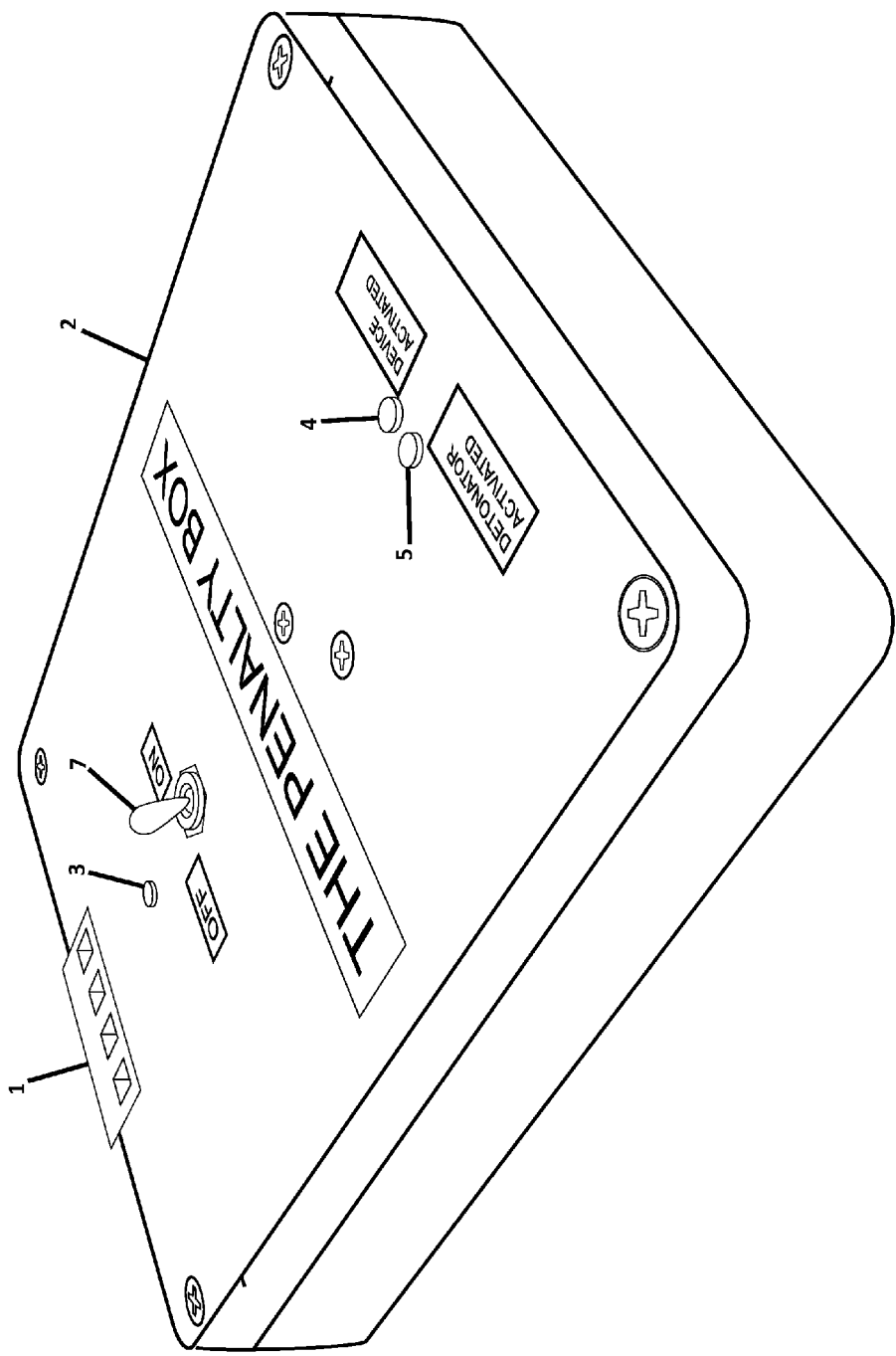
FIG. 3 is a drawing of one embodiment of the PB. In this embodiment, the PB comprises three LEDs: one LED (3) indicates PB power, a second LED (5) indicates detonator firing, and a third LED (4) indicates switch detection. The PB also has, in this embodiment, an on/off switch, such as a toggle switch (7), and an optional reset switch or push button (not shown).

The exemplary circuit diagram shown in FIG. 2 is broken down into several functional blocks (represented as dashed boxes). The input from the IED or other target device is monitored as shown in the bottom left corner of the diagram. The input is connected to a simulated bridge, which is constructed of a resistive network bridge with the equivalent load of one ohm. The resistive network bridge outputs to the amplifier block (alternatively, to an absolute value voltage difference follower block), which is titled "Input Polarity Detection" in FIG. 2. The voltage drop across the simulated bridgewire, regardless of initial polarity, is converted to a positive voltage relative to ground. The input polarity detection block outputs to other blocks, four in FIG. 2, that evaluate the voltage level. The top left block titled "Voltage Detection" indicates a yellow light if any voltage is detected across the bridge, no matter how brief. The voltage threshold to trigger the switch detection output is on the order of about 10 mV.

The three central circuit blocks in FIG. 2 control the timing of the Penalty Box. The top central block is the low voltage detection timer circuit (titled "Low Voltage Detection"). When the input voltage is below 2.5V (in this example), it controls the output circuit, which drives the red LED and the input cutoff relay (top right box titled "Input Cutoff"). The red LED and relay activate if there is a detonation event, which would occur when the power is applied to the bridgewire for a time that exceeds the timer trigger setting of the low voltage detection circuit. The resistor-capacitor (RC) circuit in the low voltage detection circuit charges up when voltage is applied. The rate of charge up changes because the voltage applied to the RC circuit depends on the PB input voltage. The RC circuit outputs to Op Amp (U3d), which is configured as a comparator. When the voltage at the non-inverting input exceeds the reference voltage set on the inverting Op Amp input, the output is triggered, indicating a detonation event. The red LED is latched on and the relay cuts power to the simulated bridgewire.

Simultaneously, under the condition where the input voltage is below 2.5 volts (in this example), the high voltage detection timer circuit (titled "High Voltage Detection") is suppressed by the circuit element titled "High Voltage Suppression." The output of the delay timer RC circuit element is grounded by the metal oxide semiconductor field effect transistor (MOSFET) (Q2), thus preventing charge up. The non-inverting input of Op Amp (U3b) is held at zero volts. The Op Amp is being used as a comparator driven by the RC circuit.

The high voltage detection circuit is identical to the low voltage detection circuit, except for the value of the RC circuit time constant. The high voltage detection RC circuit element has a shorter time constant. Thus, the high voltage timer needs to be suppressed when the input is below 2.5V (in this example) or it will always trigger the PB regardless of input voltage level.

In the embodiment in FIG. 2, the Op Amps labeled U4a, U2b, and U2c are configured as follower circuits for electrical isolation of the respective circuit elements. The Op Amp labeled U3a is configured as a comparator. The Op Amps labeled U2a and U2d are configured as amplifiers.

As an alternative embodiment of the PB, the detonator response characteristics can be programmed into a microcontroller or programmable integrated circuit (PIC) to read the voltage across the simulated bridgewire and software can be used to set the output of the microcontroller or PIC delay time and no-fire condition. The use of a microcontroller or PIC would require fewer discrete components and may increase the accuracy of the timing component of the PB. However, its use may increase cost, requires supporting software, and requires knowledge of a programming language.

IED Disruption

In the art of bomb disablement, most terrorist-type bombs, such as IEDs, are diffused remotely by the use of disarmers or disrupters. The disarming or disrupting of an IED, which is often housed in a hardened enclosure, such as a steel container, involves the penetration of the enclosure with a disarmer or disrupter without setting off the IED.

A disrupter is a tool designed to remotely or otherwise fire a variety of projectiles into a bomb to disable or dislodge the circuit and other bomb component(s) without initiating the explosive material within the bomb. Most disrupters are capable of firing projectiles that can penetrate steel containers, such as ammo cans, but the net result is the production of substantially high shock pressures, which will shock-initiate sensitive explosives, such as dynamite. Thus, water is the most common projectile, because it delivers a large amount of energy with controlled shock pressures.

Percussion-actuated, non-electric (PAN) disrupters are tools designed specifically to remotely disrupt and render safe IEDs. PAN disrupters act as a cannon using a shock tube propelled firing pin for cartridge initiation. They are constructed from tough, corrosion-resistant materials, such as stainless steel, and are preferably heat-treated to provide a combination of maximum yield strength and toughness. When a PAN disrupter is fired against an IED, it accelerates a projectile, such as water, lead shot, clay, steel, or other material, toward the target to disrupt the circuit or other bomb component(s). Upon such impact, the projectile induces pressure into the bomb target. The impact pressure and duration should be carefully controlled. If the pressure is too high or the duration too long, the projectile has the capability of shock-initiating the explosive(s) inside the bomb.

The PB operation is simple. Leads are extended from the output of an inert or mock IED and connected to the PB connectors. If explosively driven projectiles are used, for example from a PAN disruptor, or countercharges are used against a target device, e.g., IED, then the leads should be at least eight feet long. The technician, engineer, trainee, or other operator should consider the gauge and length of the lead wire, and lead wire should not be mechanically, or otherwise, spliced to reduce additional electrical resistance that would skew the PB output. In bench-top testing and manual entry training, the lead wires can be as short as the operator chooses. After the IED is connected to the PB, the power switch is thrown and an indicator on the PB, such as a green light, indicates that the PB is monitoring the target device. The operator can now arm the inert or mock IED and perform actions to function or render safe the inert or mock IED circuit. The PB output will indicate if a switch was activated by, for example, a yellow indicator light, and if a detonator would have functioned, e.g., fired, by, for example, a red indicator light.

Because the PB output latches, the operator does not have to be down range with the PB during the event. After an action such as an explosive disruption, the operator can go down range and safely determine if the IED was disabled and if during the disablement attack whether a switch in the IED was activated. The operator would then hit the PB's reset button to set the PB back into monitoring mode. If a operator needs immediate indicators, the leads can be extended to the safe area up range. However, it is recommended that larger gauge wire greater than or equal to 16 AWG be used if the lead wire is extended beyond 30 feet. Alternatively, an audible alarm, such as a beeper, or a radio frequency signal can be transmitted to the operator by connecting a beeper/buzzer to the magnet relay or SCR at the output of the PB.

To add realism and additional diagnostic indicators, a detonator fiducial (inert detonator) can be used inside the IED and connected the same as the PB. In this case, the detonator fiducial bridgewire has to be broken and wired in parallel with the PB bridge emulator. If the operator attempted to measure the bridgewire resistance or voltage drop across the bridgewire, he or she would actually be measuring the value(s) on the bridge emulator.

Testing and Evaluation

A 200 watt rated precision one ohm equivalent resistor network was used in the PB as the bridgewire substitute. Thus, as a battery was placed under load, it was experiencing the same draw as a nichrome hot-wire detonator. Various power sources were used to determine the PB response characteristics and the output delay time. The PB's response was tested against a single cell 'AA' battery, a 9V battery, two 9V batteries in parallel, two 9V batteries in series, and three 9V batteries in series. The open circuit voltage and the current capacity were measured for each battery circuit to calculate the internal resistance. The theoretical ignition time was calculated and compared to the trigger time of the PB firing circuit. The trigger time was within 7 microseconds of the predicted ignition time for the 9V battery systems tests, which was less than 10% difference. If there was only one timing circuit in the PB and it was calibrated with 9V batteries, testing revealed a higher PB timing error when 'AA' 1.5V batteries powered the simulated bridgewire. The PB firing circuit time was within 20% of the predicted ignition time. This increased deviation in time was mathematically predicted.

A function generator was used to determine the switch monitoring capability of the PB and to test if the firing circuit would not trigger below the ignition time. The PB did not function when pulses were below the ignition time; however, the switch monitoring circuit detected the pulse.

In addition to bench-top testing of the PB, field tests were conducted using the PAN disruptor and various disruptor projectiles. As stated above, the PAN disruptor acts as a cannon and fires a projectile into a target device tearing it apart. The distance between a fast responding break-wire trigger and a target 9V alkaline battery ranged from 5 inches to 36 inches. A barrier (plywood or cardboard) was used to simulate the outer surface of an IED container. A fast responding break-wire trigger was placed directly on the outer surface of the barrier. During the first test series, high velocity Avon rounds were shot through the cardboard or plywood barrier. At a 5 inch separation between the break-wire and the battery wires, it was predicted that the round would kill the power to the circuit before the PB firing circuit would trigger. The PB indicated switching was detected, but did not fire. At further distances, the PB was predicted to indicate switching and firing and the PB functioned as predicted. A yellow LED indicated switch activation was detected and a red LED indicated that the firing circuit functioned.

The next series of tests were conducted with low velocity clay rounds as the projectile, which are much slower than the Avon PAN disruptor round. Distances between the barrier and target device ranged from one foot to 1.75 feet. The PB was predicted to indicate switching and firing, and functioned as predicted.

A third series of shots, also using clay rounds as the projectile, utilized three different triggering switches placed on the barrier. High speed video of the projectiles was collected. In all cases, the switch was separated from the battery by 1.75 feet. The PB detected switching and fired in accordance with the ignition time. An oscilloscope monitored the PB input during two of the tests. A Dyno-Nobel SuperStar detonator was also wired into the test circuit as a control and it fired. The oscilloscope trace for the detonator was similar in shape to the oscilloscope trace for the PB.

Another test was conducted with a black powder cartridge driving a water projectile. The water projectile was slower than the low velocity clay PAN disruptor round. A cardboard barrier was used to represent a soft package. The break-wire was one foot from the target battery. The PB firing circuit had an activation time calculated to be 0.5 msec from the moment power was applied to the simulated bridgewire. A high speed camera revealed the time of circuit activation to battery impact was 1.2 milliseconds and as expected the PB indicated switch detection and firing.

It is to be appreciated that the Detailed Description section is intended to be used to interpret the claims. The Summary and Abstract sections may set forth one or more, but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art(s), readily modify and/or adapt for various applications such specific embodiments, without undue experimentation, without departing from the general concept of the invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the phraseology or terminology of the specification is to be interpreted by the skilled artisan in light of the teachings and guidance.

What is claimed is:

1. A system for simulated explosives training, comprising: a simulated, mock, or inert explosive device without an initiator; at least one sensor connected to said simulated, mock, or inert explosive device, the sensor outputting a signal corresponding to a measurable parameter sensed by the sensor; a controller interfacing with said sensor; a feedback device interfacing with said controller, wherein the feedback device is actuated in response to the signal achieving a pre-determined threshold; and a display for displaying a representation of said signal, wherein the representation of said signal is displayed in real time;
wherein the sensor comprises a simulated initiator.

2. A method for simulated device training or testing using the system for simulated explosives training claimed in claim 1, comprising: connecting the simulated, mock, or inert explosive device to the at least one sensor; firing a projectile into the simulated, mock, or inert explosive device, whereby a signal is produced corresponding to a measurable parameter sensed by the at least one sensor; reviewing the at least one sensor for feedback on the simulated, mock, or inert explosive device in response to the signal reaching a pre-determined level; and displaying a representation of said signal, wherein the representation of said signal is displayed in real time.

3. A method for training a bomb technician or trainee, comprising: providing a simulated bomb without an active initiator connected to at least one sensor in a device having a simulated initiator; disrupting or disarming the bomb causing the device to receive a signal corresponding to a measurable parameter sensed by the at least one sensor; analyzing the sensor data received by the device from the at least one signal; and providing feedback in response to the sensor data to the bomb technician or trainee.

4. The method of claim 3, wherein the feedback is provided by a video representation of the bomb technician or trainee captured during the training.

5. The method of claim 3, wherein the signal corresponding to the measurable parameter sensed by the at least one sensor is received by the device in real time.

6. The method of claim 3, further comprising adjusting a threshold of the at least one sensor.

7. A simulated detonation device comprising: a bridge emulator in series with a circuit that converts voltage from the bridge emulator to an absolute value, at least one electrical isolation circuit, at least one switch detection circuit, at least one no-fire comparator circuit, at least one voltage threshold delay timer selector circuit, at least one voltage dependent delay timer circuit, at least two latching output switches, at least two indicators, and at least two attachment points attached to the outside of the device;
wherein the converter circuit is in series with the electrical isolation circuit;
wherein the electrical isolation circuit is in series with the switch detection circuit and in series with the no-fire comparator circuit and in series with the voltage threshold delay timer selector circuit and in series with the voltage dependent delay timer circuit, wherein the voltage threshold delay timer selector circuit is also in series with the voltage dependent delay timer circuit;
wherein the switch detection circuit is in series with the first latching output switch, which is in series with the first indicator; and
wherein the no-fire comparator circuit and the voltage dependent delay timer circuit are both in series with the second latching output switch, which is in series with the second indicator.

8. The simulated detonation device of claim 7, wherein the bridge emulator comprises a resistor network.

9. The simulated detonation device of claim 8, wherein there are two voltage dependent delay timer circuits.

10. The simulated detonation device of claim 9, wherein there is a third indicator.

11. The simulated detonation device of claim 10, wherein the indicators represent the existence of power to the simulated detonation device, switch activation, and detonation or firing.

12. The simulated detonation device of claim 11, wherein at least two leads of a simulated explosive device are attached to the at least two attachment points attached to the outside of the device.

13. The simulated detonation device of claim 12, wherein the simulated explosive device is a mock or inert improvised explosive device.

14. The simulated detonation device of claim 13, wherein the mock or inert improvised explosive device comprises a power source.

15. The simulated detonation device of claim 14, wherein the power source of the mock or inert improvised explosive device is at least one battery.

16. The simulated detonation device of claim 7, further comprising a circuit breaker, which is in series with the second latching output switch.

17. The simulated detonation device of claim 7, wherein the converter circuit is an absolute value voltage difference follower circuit.

18. The simulated detonation device of claim 7, wherein the converter circuit is a differential amplifier circuit.

* * * * *